(12) United States Patent
Albertsson et al.

(10) Patent No.: US 7,320,264 B2
(45) Date of Patent: Jan. 22, 2008

(54) MANIPULATOR

(75) Inventors: Torbjorn Albertsson, Lindome (SE);
Thomas Carlstrom, Gothenburg (SE)

(73) Assignee: ABB AB, Västerås (SE)

( * ) Notice: Subject to any disclaimer, the term of this patent is extended or adjusted under 35 U.S.C. 154(b) by 284 days.

(21) Appl. No.: 09/902,536

(22) Filed: Jul. 11, 2001

(65) Prior Publication Data

US 2002/0007692 A1    Jan. 24, 2002

(30) Foreign Application Priority Data

Jul. 14, 2000    (SE)    .................................... 0002654

(51) Int. Cl.
*B25J 17/00*    (2006.01)

(52) U.S. Cl. .................... 74/490.02; 414/680

(58) Field of Classification Search ............. 74/490.01, 74/490.02, 665 L; 414/729, 918, 680; 901/41, 901/42, 50; 403/325
See application file for complete search history.

(56) References Cited

U.S. PATENT DOCUMENTS

| | | | | |
|---|---|---|---|---|
| 2,596,133 | A | * | 5/1952 | Donahue et al. .............. 266/23 |
| 3,957,123 | A | * | 5/1976 | Federspiel ................... 172/481 |
| 4,507,042 | A | * | 3/1985 | Suzuki et al. ................ 414/680 |
| 4,529,352 | A | * | 7/1985 | Suzuki et al. ................ 414/680 |
| 4,705,243 | A |   | 11/1987 | Hartmann et al. |
| 4,767,257 | A | * | 8/1988 | Kato ............................ 414/918 |
| 5,240,092 | A | * | 8/1993 | Eachus ........................ 414/918 |
| 5,437,207 | A |   | 8/1995 | Zimmer |
| 5,593,265 | A | * | 1/1997 | Kizer ........................... 403/325 |
| 5,651,519 | A | * | 7/1997 | Goodrich et al. .............. 248/51 |
| 5,816,736 | A | * | 10/1998 | Kroulik ..................... 248/52 X |
| 6,684,731 | B1 |  | 2/2004 | Karlinger |

FOREIGN PATENT DOCUMENTS

| | | |
|---|---|---|
| DE | 92 17 659 U | 4/1994 |
| DE | 9406405 U1 | 8/1995 |
| DE | 29803637 U1 | 7/1999 |
| DE | 29902947 U1 | 7/1999 |
| DE | 29908523 U1 | 7/1999 |
| DE | 29908623 U1 | 7/1999 |
| JP | 59061573 | 4/1984 |
| JP | 63039416 A | 2/1988 |

OTHER PUBLICATIONS

International Pub. No. WO 98/19090, Cable Assembly Holder for an Industrial Robot, Stefan Springmann, May 7, 1998.
European Search Report

* cited by examiner

*Primary Examiner*—David M. Fenstermacher
(74) *Attorney, Agent, or Firm*—Venable LLP; Eric J. Franklin

(57) ABSTRACT

An industrial robot manipulator including a first arm comprising a front arm part and a rear arm part. The front arm part is journalled in the rear arm part such that the front arm part is rotatable about a first axis relative to the rear arm part. Cabling extends along the front arm part and the rear arm part. A supporting device is operative to support the cabling. The supporting device includes a supporting arm arranged in the vicinity of the rear arm part and rotatably supported about a second axis and an auxiliary arm operatively connected to the front arm part. The supporting arm applies a spring pulling force on the cabling in a longitudinal direction of the cabling.

21 Claims, 1 Drawing Sheet

MANIPULATOR

TECHNICAL FIELD

The present invention relates to an industrial robot comprising a control device and a manipulator, in which a device is arranged for holding cabling along the manipulator. More particularly, the invention relates to a supporting device for holding a part of the cabling, which part extends between two mutually movable arm parts of the manipulator, such that a slack of the cabling is absorbed. The supporting device comprises a resilient supporting arm with an attachment for holding the cabling.

BACKGROUND ART

In industrial robots there are generally three distinguishable sets of cabling. Power cabling comprising a bundle of electric-power cables is arranged for driving the movements of the robot. This cabling may also comprise the supply of power for operating a tool carried by the robot. Signal cabling comprising a bundle of signal cables is arranged for controlling the robot and the tool. Finally, process cabling is also arranged, comprising electric cables, hoses, pressure tubes or the like for supply of energy, pressure medium, coolant, etc., for the tool. Normally, the first two types of cabling are laid, protected, inside the manipulator. The process cabling is, however, normally coarser and less bendable and must, in addition, be capable of being easily replaced, so this cabling is fixed outside the manipulator. However, this location entails a risk of the cabling being damaged. It is also exposed to wear.

In manipulators, there is a general problem of ensuring the supply of the tool during all the movements of the manipulator for a long period of time. The greatest single reason for disturbances of the production of robots are hose and cable breakdowns of the process cabling at the wrist. Traditional suspension devices for process cabling often encroach in an adverse manner upon the working range of the robot. When the robot is performing more extreme hand movements, the cabling is also subjected to great tensile stresses and is subjected to wear against the rotor arm.

A special problem exists in anthropomorphic robots, where the upper axis rotates around its own longitudinal axis. In such robots, the cabling must be capable of being wound up around the upper arm. In such contexts, it is usual for the arm to be able to rotate, from an initial position, more than half a turn in both directions. The line bundle must therefore extend along the envelope surface of the robot arm. When the arm is in its neutral position, the necessary length is equal to the length of the arm. During rotation half a turn, however, the required length increases. The increase corresponds to the case where the line bundle, during rotation, must be laid half a turn around the envelope surface of the robot arm. This distance constitutes half the circumference of a circle with a radius defined by the distance between the axis of rotation and the center of the line bundle. A calculation shows that the required length of the line bundle becomes between 20 and 50% longer than the arm itself.

A surplus of the cabling must thus be arranged such that it can be wound around the upper arm when this arm is rotated. Usually, this surplus of cabling is arranged in a loop. When thus the cabling, during rotation of the upper arm, is wound up thereon, the cabling is stretched to the maximum extent. When the upper arm is in its initial position, the cabling is slack and the surplus then forms a loop. It is not unusual for this loop to exceed half a meter. This loop of the cabling often encroaches upon the working range of the rotor. During operations of the robot, the loop is often set into oscillation. It may then get stuck in objects within the working range. A freely oscillating loop is also subjected to fatigue, which may lead to failure in the cables.

From U.S. Pat. No. 4,705,243 (KUKA), an industrial robot is previously known, in which a plurality of holders are arranged for holding and guiding a line bundle from the stand to the tool. The majority of holders are rotatably fixed directly to the robot structure. The line bundle is adapted to run in loops between the holders. These loops ensure that the line bundle may follow all the movements of the manipulator.

One of the holders is rotatably attached to a resilient arm, which in turn is rigidly attached to the upper arm of the robot. The task of this robot is to hold a loop of the line bundle at a distance from the robot and allow the loop to accompany it during rotation of the upper arm. Since the arm itself consists of a spiral spring, the arm allows a deflection when stretching the cabling. In case of a minor deflection, the holder follows a circular path with its center in the attachment of the arm at the robot. In case of a major deflection, the bending center is moved further out on the resilient arm. The angular change of the holder thus increases progressively with the deflection. Large buckling loads are thus imparted to the cabling when the resilient arm is deflected.

An additional manipulator is known from the patent document WO098/19090 (ABB, Springmann), in which the cabling is running in a tube. This tube has a spring arranged in it, which exerts a returning attractive force on the cabling such that its slack is held on one side of the tube and which is usually directed backwards from the hand of the robot. In this way, the cabling is allowed to run back and forth in the tube while the spring exerts a force which all the time tends to hold the cabling stretched from the tube and up to the hand. The known robot has a complicated design and involves a drawback when replacing the cabling. The cabling is also worn during the movement in the tube.

SUMMARY OF THE INVENTION

The object of the present invention is to provide a device for holding and stretching cabling of the kind described above such that loosely hanging loops are avoided and such that damage due to fatigue is counteracted. A further object of the invention is to stretch the cabling such that it does not conflict with objects within the working range of the robot and unnecessarily encroaches on this working range. The device shall be simple and cost-effective and shall permit the cabling, with a minimum of space requirement, to be moved from an attachment at a first arm to a second arm. The second arm may be in the form of the tool at the hand of the manipulator.

The manipulator according to the invention comprises a plurality of mutually movable arms, of which a first arm is rotatably arranged around a first axis and a second arm is rotatably arranged around a second axis. Cabling extends along the mutually movable arms and a supporting device supports a part of the cabling extending between the first arm and the second arm. The supporting device is arranged at the first arm and comprises a supporting arm which is rotatable around a third axis and which exerts a resilient force in the longitudinal direction of the cabling. A first attachment, surrounding the cabling, is arranged at the outer end of the supporting arm. The first attachment and the third axis are thus arranged on opposite sides of the longitudinal axis of the first arm. The supporting device also comprises an auxiliary arm with a second attachment arranged at the second arm.

According to the invention, a rotatable supporting arm is arranged at the upper arm, which supporting arm exerts a resilient force on the cabling. The supporting arm is, in its relaxed position, arranged at an angle to the cabling. In this position, the attachment, which approximately resembles a short sleeve surrounding the cabling, is arranged with its center line coinciding with that of the cabling. When the supporting arm is rotated, the center line of the attachment is rotated in relation to that of the cabling and hence forces the cabling to form a so-called S curve. The size of this S curve is determined by the longitudinal displacement of the cabling and by the length of the resilient supporting arm. By placing the center of rotation of the supporting arm on the other side of the robot arm, according to the invention, a larger length is imparted to the supporting arm, the rotation of the attachment in relation to the longitudinal direction of the cabling thus being small.

In a preferred embodiment, the attachment is rotatably attached to the resilient arm, whereby the risk of buckling of the cabling is further reduced. In an additional preferred embodiment, a bendable tube is arranged between the resilient holder and the auxiliary holder, in which bendable tube the cabling is enclosed. The auxiliary arm is attached to the tool or to the turning disc of the manipulator. The attachment of the supporting arm, as well as the attachment of the auxiliary arm, is sleeve-shaped and provided with a snap-in attachment to permit rapid mounting and dismantling of the cabling.

The spring force of the supporting arm is achieved in an advantageous embodiment by a spiral spring, which is arranged at the shaft of the supporting arm. The spiral spring is suitably arranged in a casing so as to protect the spring. The casing may also be arranged to be a tensioning element for tensioning the spring.

BRIEF DESCRIPTION OF THE DRAWINGS

The invention will be explained in greater detail by description of an embodiment with reference to the accompanying drawings, wherein.

DESCRIPTION OF THE PREFERRED EMBODIMENTS

Figure 1:
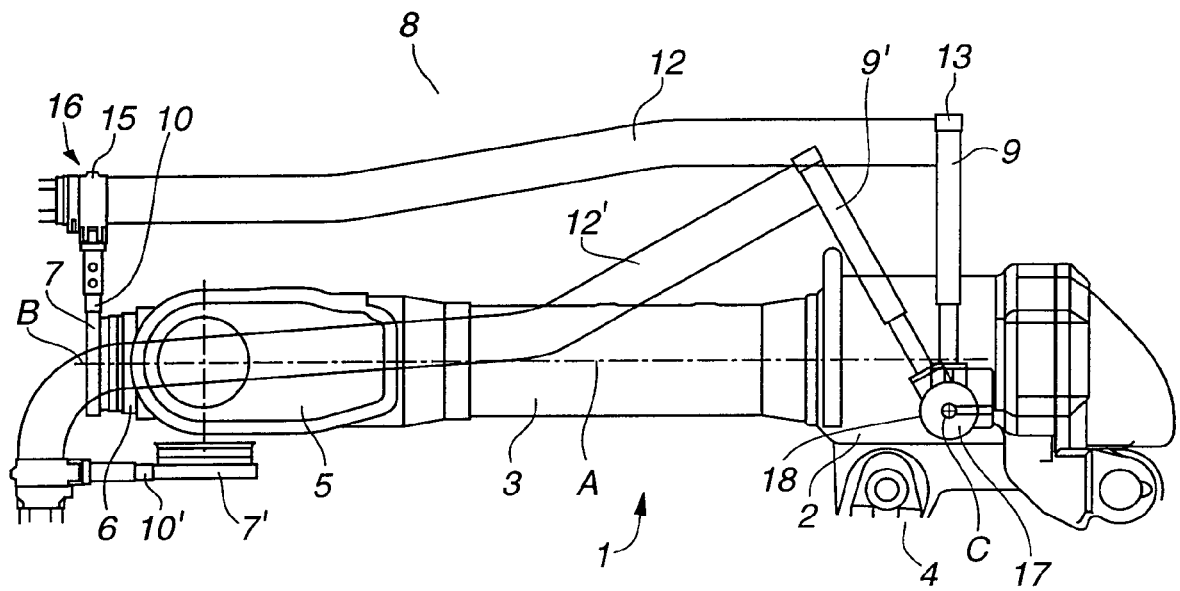
FIG. 1 shows a side view of an upper arm of a manipulator with a supporting device for cabling according to the invention.
Figure 2:
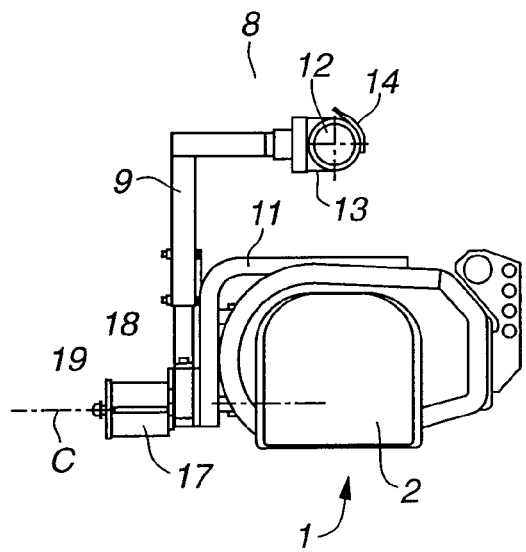
FIG. 2 shows a rear view of the supporting device, according to the invention, mounted on an upper arm of a manipulator, the rest of which is not shown.

With reference to FIGS. 1 and 2, there is shown an upper arm 1 of a manipulator, the rest of which is only partially shown. The upper arm comprises a rear arm part 2 and a front arm part 3. The rear arm part is supported by a lower arm 4, which is only partially shown. The front arm part is journalled in the rear arm part and is rotatable around a first axis A. The front arm part supports a fork-shaped wrist 5, in which a hand 6 is journalled. In the outer end of the hand, a turning disc 7 is journalled, the task of which is to support a tool (not shown). The turning disc is rotatable around a second axis B.

The manipulator has a supporting device 8 for cabling which comprises a supporting arm 9 and an auxiliary arm 10. The supporting arm is journalled in a stand 11 which is fixed to the rear arm part 2 and which is rotatable around a third axis C. In the figure, the axis C is arranged across the first axis A. The supporting arm comprises in its outer end a first attachment 13, which in the figure comprises a snap-in closure 14 for simple mounting and dismantling of cabling 12. In the same way, the auxiliary arm supports a second attachment 15 with a snap-in closure 16.

In the example shown, the supporting arm is provided with an angled part 9a which permits the cabling to be supported centrally over the upper arm. The supporting arm and the auxiliary arm support between themselves the cabling 12. The figure also shows how the cabling runs when the hand is rotated. The position of the auxiliary arm, adopted during such a movement, is shown by the designation 10', the supporting arm by 9' and the cabling by 12'.

The supporting arm exerts a spring force on the cabling. This spring force is exerted by a spiral spring 17 which is arranged around the third axis C. To protect the spring, the spring is housed in a container 18, which in the example is cylindrical. In an outer part of the container, a tensioning device 19 is arranged to tension the spring to the desired extent. In an initial position of the supporting arm 9, the spring force is directed backwards along the cabling, that is, to the right in the figure. When the supporting arm is bent out, the spring force rotates in relation to the longitudinal direction of the cabling. In addition to the pulling force, the supporting arm then also tends to lift the cabling. This is favourable when the cabling is wound up around the rotatable front arm part. To prevent the supporting arm from exerting an uneven load on the cabling, the attachment of either the supporting arm or the auxiliary arm, or both, may be arranged with an articulated attachment to the respective arm.

In the embodiment, the cabling is conceived to be surrounded by a rigid hose, which may advantageously be a plastic tube with grooves in order to be bendable. It is, of course, within the scope of the invention that the holder may support any kind of cabling or hoses. It is also realized that the holder or the supporting arm may have other embodiments. Thus, the supporting arm may also comprise several arms arranged in a four-linkage system. It is also realized that the spring force may be achieved by a plurality of arrangements of springs. Thus, it also comprises a torsion spring as well as tensile springs and compression springs which, by means of a link, influence the supporting arm.

The main idea behind the invention is to guide and hold the cabling stretched in the front part of the manipulator, such that the loop, which must be kept at disposal for the movement of the front robot arms, is arranged behind the upper robot arm.

The angles and directions which have been indicated in the example are by no means limiting. Thus, the axes A and C, stated in the example, may have an arbitrary direction. It is also realized by the person skilled in the art that, since the holder is arranged to be fixed to an arm of a robot, the directions and conditions stated are changed with the movements of the robot.

It is also realized by a person skilled in the art that, in order to hold and guide a slack of cabling between a plurality of movable arm parts, the holder may be arbitrarily attached to one of the arm parts.

The invention claimed is:

1. An industrial robot manipulator, comprising:
   a first arm comprising a front arm part and coaxial a rear arm part, the front arm part being journalled in the rear arm part such that the front arm part is rotatable about its longitudinal axis relative to the rear arm part;
   a second arm rotatably connected to the front arm part of the first arm and rotatable about a second axis;

cabling extending along the front arm part and the rear arm part; and a supporting device operative to support the cabling, the supporting device comprising:

a supporting arm connected to the rear arm part and rotatably supported about a rotation axis, the supporting arm being rotatable about the rotation axis between a relaxed position and an extended position and applying a spring pulling force to the cabling to guide and hold the cabling stretched between the supporting arm and the second arm, and an auxiliary arm connected to the second arm.

2. The manipulator according to claim 1, further comprising:

a first attachment operatively connected to the rear arm part and operative to receive the cabling.

3. The manipulator according to claim 2, wherein a first attachment is arranged at a distal end of the supporting arm.

4. The manipulator according to claim 2, wherein the first attachment surrounds the cable.

5. The manipulator according to claim 1, further comprising:

a second attachment operatively connected to the auxiliary arm and operative to receive the cabling.

6. The manipulator according to claim 5, wherein the second attachment surrounds the cable.

7. The manipulator according to claim 1, wherein the supporting device winds the cabling around the front arm part when the second arm is rotated.

8. The manipulator according to claim 1, wherein the first axis and the second axis are perpendicular to each other.

9. The manipulator according to claim 1, further comprising:

a spiral spring operative to rotate the supporting arm about the rotation axis to apply the spring force to the cabling.

10. The manipulator according to claim 9, further comprising:

a casing operative to protect the spring.

11. The industrial robot according to claim 10, wherein the casing is a tensioning element operative to tension the spring.

12. The industrial robot according to claim 1, wherein the supporting arm is connected in the vicinity of a proximal end of the rear arm part of the first arm.

13. The industrial robot according to claim 1, further comprising:

a rigid tube arranged between the supporting arm and the auxiliary arm and enclosing the cabling.

14. The industrial robot according to claim 13, wherein the tube is bendable.

15. The industrial robot according to claim 1, further comprising: snap-in cable attachments provided on the supporting arm and the auxiliary arm.

16. The industrial robot according to claim 1, wherein the supporting arm comprises an angle part operative to permit the cabling to be supported centrally over the first arm.

17. The manipulator according to claim 1, wherein the supporting arm applies the spring pulling force in a longitudinal direction of the cabling and lifts the cabling away from the first arm.

18. The industrial robot according to claim 1, wherein upon rotation of the front arm part about the first axis the cabling is wound around the front arm part.

19. The industrial robot according to claim 1, wherein the supporting arm comprises a plurality of arms arranged in a four-linkage system.

20. The industrial robot according to claim 1, further comprising:

a spring arrangement operative to apply a spring force to the supporting arm.

21. The industrial robot according to claim 20, wherein the spring arrangement comprises a torsion spring, a tensile spring, or a compression spring.

* * * * *